June 9, 1964
D. E. GRISWOLD
3,136,333
MODULATING VALVE CONTROL SYSTEMS
Filed April 25, 1960
3 Sheets-Sheet 1
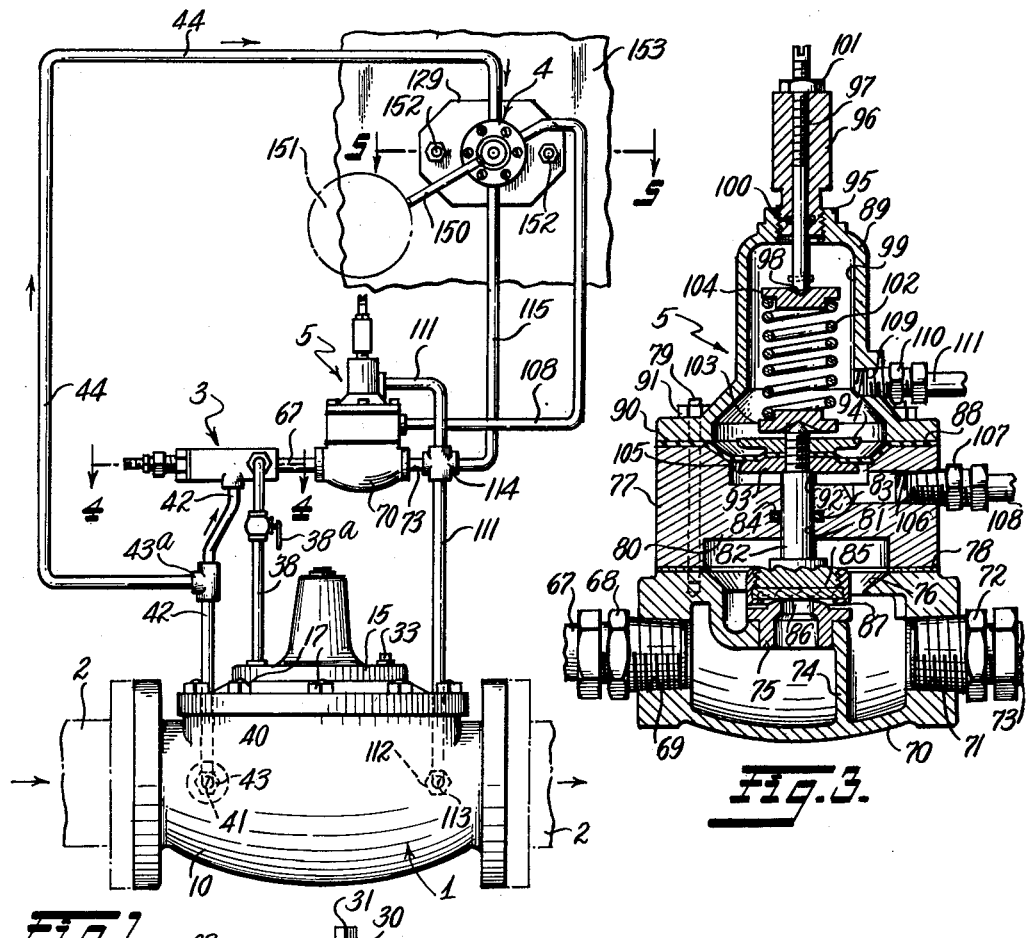
Fig.3.
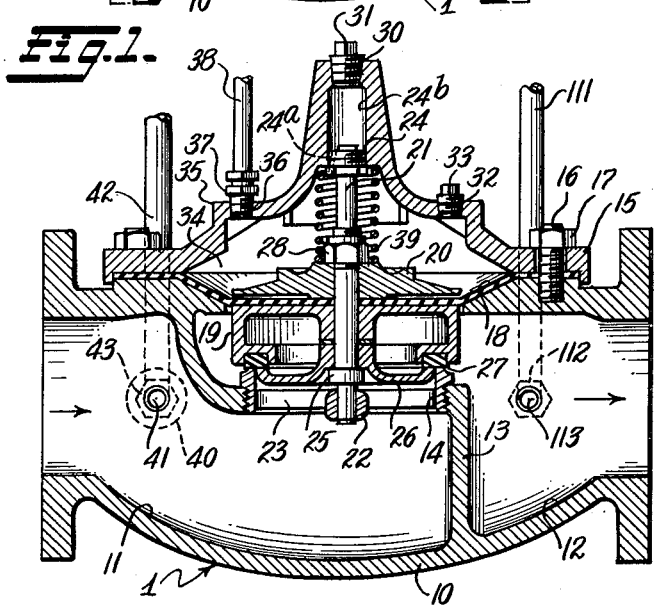
Fig.1.
Fig.2.
INVENTOR.
David E. Griswold
BY
Bacon Thomas
ATTORNEYS June 9, 1964 D. E. GRISWOLD 3,136,333
MODULATING VALVE CONTROL SYSTEMS
Filed April 25, 1960 3 Sheets-Sheet 2
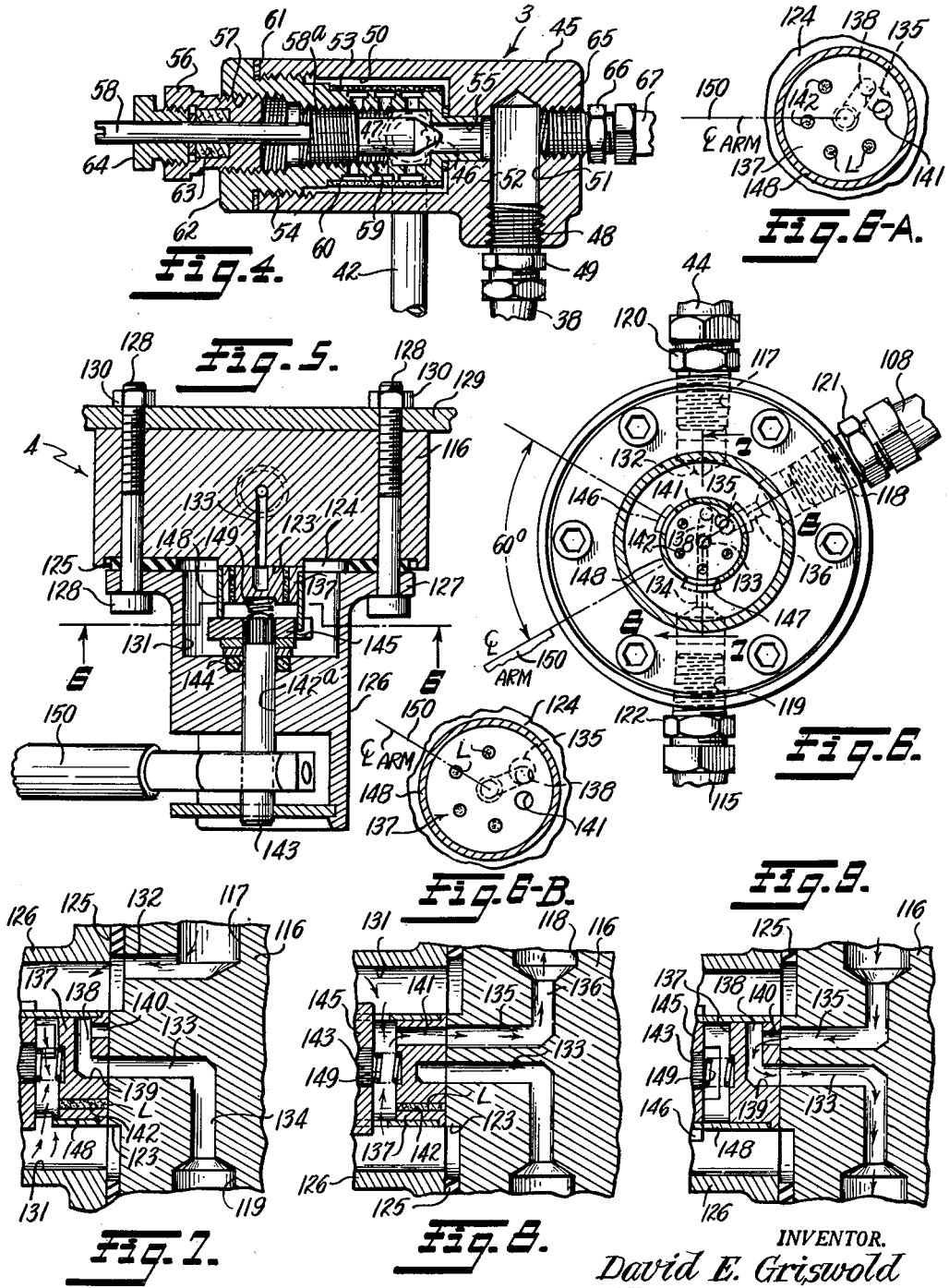
INVENTOR.
David E. Griswold
BY
Bacon & Thomas
ATTORNEYS June 9, 1964

D. E. GRISWOLD 3,136,333

MODULATING VALVE CONTROL SYSTEMS

Filed April 25, 1960

INVENTOR.
David E. Griswold
BY
Bacon & Thomas
ATTORNEYS

United States Patent Office 3,136,333
Patented June 9, 1964

3,136,333
MODULATING VALVE CONTROL SYSTEMS
David E. Griswold, Newport Beach, Calif., assignor to
Donald G. Griswold, Newport Beach, Calif.
Filed Apr. 25, 1960, Ser. No. 116,903
16 Claims. (Cl. 137—489)

The present invention relates to a modulating valve control system for causing a main valve to modulate in degree of opening and, hence, rate of flow, in relation to the position or action of a mechanical-hydraulic pilot control, which may be located at a remote point from the main valve.

More particularly, the invention relates to a modulating valve control system in which the main valve directly follows the pilot control to maintain any position of the main valve as called for by the pilot control, from a completely closed position (zero percent capacity) to its fully opened condition (100 percent capacity).

The invention further relates to a modulating valve control system including a power amplification feature, in that only a very small force is required to actuate the pilot control, while a much greater force or system pressure is employed as a power source to positively actuate and control the main valve.

The invention further contemplates a modulating valve control system in which a proportional intermediate pressure lying between the main valve inlet and discharge pressures can be utilized in conjunction with a pilot control for controlling the flow rate through the main valve.

Heretofore, certain pilot-controlled modulating valve systems have been based upon the principle of operation wherein the pilot control device, in combination with the main valve, in effect, directs the main valve to move in a direction to increase or decrease its degree of opening according to whether the factor or condition to be controlled is above or below a given desired point. The basic disadvantage or limitation of such operation is that the control system itself calls for a direction of change alone and depends on a follow-up signal to stop or reverse this changing action. As a result, any lag or indirectness between valve adjustment and the change in the controlled conditions can cause the system to cycle, overtravel, or hunt, thereby rendering the same unstable. In addition, the neutral or stable range of a control system of this type is usually very narrow and critical, and, from a practical standpoint, the system will not tend to stabilize at exactly the desired setting.

The principle of the modulating valve control system comprising the present invention is that the pilot control can be preset to direct the main valve to establish and maintain a given flow rate under certain conditions. Therefore, as any changes in flow rate are required by varying demand or conditions, the control system governs the direction of, as well as the degree of any changes in, the main valve flow rate. The pilot control can be made to respond to any one of many different conditions to be controlled. For example, the pilot valve can be made responsive to the liquid level in a tank, or made responsive to given pressure or temperature conditions, or may be controlled by manual setting, or by any other controlling conditions, wherein the condition or position of the controlling device is related to and requires response directly in the way of changes in main valve opening.

The prinicipal object of the invention is to provide a modulating control valve system wherein the main valve is rendered extremely sensitive in responding or adjusting to any changes in the position of the controlling pilot. With this system, the controlling proportional pressure will positively vary, even though the changes in the controlling pilot position may be infinitesimal.

Another object is to provide a modulating valve control system in which an adjustable pilot control is associated with a pressure differential responsive control valve, the latter of which, in normal operation, continually responds to all pressure fluctuations and continually adjusts itself to maintain the pressure condition called for by the adjustment of the pilot control.

Another object is to provide a modulating valve control system in which the main valve is hydraulically balanced and accurately responds to pressure changes in the pilot control means, thereby providing a valve control system wherein, for all practical purposes, there is no inherent lag between controlling pilot action and the response of the main valve thereto.

Other and further objects of the invention are to provide a valve control system wherein:

The main valve opening can be varied from zero to one hundred percent of capacity in relation to the position or setting of the pilot control;

The physical position of the pilot control device is translated to a related hydraulically balanced and stable position of the main valve;

The stability of relationship is maintained between the pilot control position and the main valve opening position;

The main valve inlet pressure and/or discharge pressure does not greatly affect the main valve's positional response to the pilot control;

The effects of any changes in main valve position are immediately reflected to the modulating control system by self-correction to prevent main valve overtravel;

The hydraulically actuated valve control system does not require an outside pressure or power source for operation;

The main valve has an effective capacity range from drip-tight shut-off to wide-open capacity;

The pilot control may be installed remotely from the main valve and, wherein no mechanical linkage is required between the pilot control and the main valve;

The minimum number and minimum capacity of operating-fluid lines connect the pilot control means with the main valve;

The components and control system conduits are as compact and simple as possible;

The speed of operation of the main valve may be adjusted independently of the pilot valve setting;

A pilot control device of minimum capacity and force requirements can be employed to govern the operation of a main valve of any required size; and The pilot control cam be actuated in response to any applicable controlling conditions.

Other objects and features of the invention will be apparent from the following description, taken in conjunction with the accompanying drawings, in which:

FIG. 1 is a schematic view of one embodiment of the present modulating valve control system applied to a hydraulic type of main valve;

FIG. 2 is a vertical sectional view through the main valve of FIG. 1;

FIG. 3 is a vertical sectional view through the pressure differential operated valve of the control system shown in FIG. 1;

FIG. 4 is a horizontal sectional view taken on line 4—4 of FIG. 1, through a needle valve and strainer assembly incorporated in the system for controlling the rate of closing of the main valve;

FIG. 5 is a horizontal sectional view through the rotary pilot valve of the system, taken on the line 5—5 of FIG. 1;

FIG. 6 is a vertical sectional view through the pilot valve, taken on the line 6—6 of FIG. 5 and illustrating the pilot disc in a position corresponding to the lowermost position of the pilot operating arm;

Figure 10:
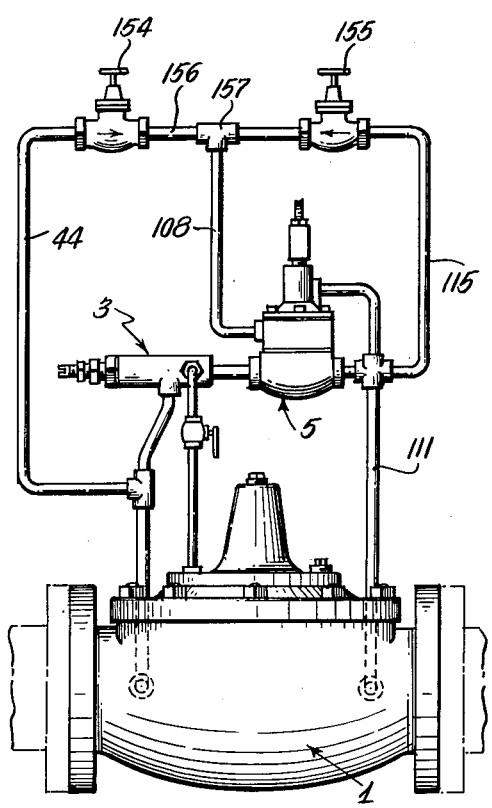
Figure 11:
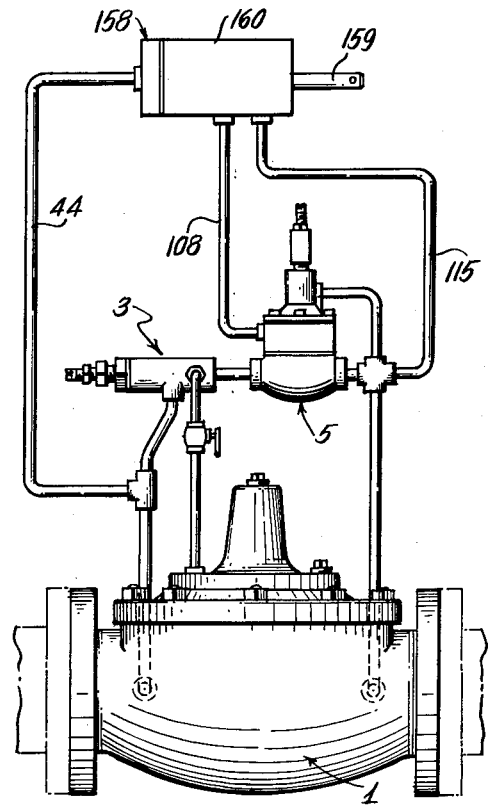
Figure 12:
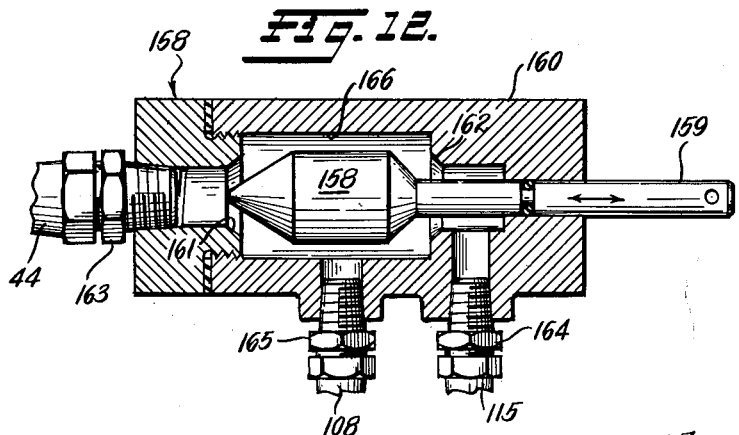

FIG. 6–A is an enlarged fragmentary view of the pilot disc and its seat, showing the relative position of the ports corresponding to a horizontal position of the pilot valve operating arm;

FIG. 6–B is a view similar to FIG. 6–A, but showing the relation of the ports corresponding to the upper limit of movement of the pilot valve operating arm;

FIG. 7 is a fragmentary vertical sectional view through the pilot disc and fluid-distributing base of the pilot valve, taken on line 7—7 of FIG. 6;

FIG. 8 is a view similar to FIG. 7, but showing the pilot disc in a position corresponding to FIG. 6–A for effecting opening action of the main valve;

FIG. 9 is a view similar to FIG. 7, but showing the pilot disc in a position corresponding to FIG. 6–B for permitting closing action of the main valve;

FIG. 10 is a schematic view of a modified modulating valve control system, including two manually operable valves that can be pre-set to control the operation of the main valve;

FIG. 11 is a schematic view of another form of modulating valve control system, including a single adjustable element which can be manually or otherwise adjusted to control the operation of the main valve; and FIG. 12 is a longitudinal sectional view through the adjustable control means for the valve shown in FIG. 11.

Referring to FIG. 1, the main valve is generally indicated by the numeral 1 and is adapted to be connected in a pipeline 2 shown in dot-and-dash lines. The valve 1 is connected by conduit means that will be described later, with a combination needle valve and strainer 3, a rotatable pilot valve 4, and a pressure differential operated pilot valve 5.

Referring to FIG. 2, the main valve 1 comprises a body 10 provided with an inlet chamber 11 and an outlet chamber 12. A partition 13 separates the chambers 11 and 12 and serves as a support for a valve seat 14. A cover 15 is secured to the valve body 10 by a plurality of studs 16 and nuts 17, a flexible conventional diaphragm 18 being interposed between said valve body and cover.

A diaphragm supporting plate 19 is disposed in the body 10 below the diaphragm 18 and another supporting plate 20 is disposed in the cover 15 above said diaphragm. A valve stem 21 extends through the diaphragm 18 and its supporting plates 19 and 20 and is slidably mounted at its lower end in a guide 22 supported by arms 23 connected with the seat 14. The upper end of the valve stem 21 is guided in a bushing 24 mounted in the cover 15. The stem 21 has a shoulder 25 disposed above the guide 22, which serves as an abutment for a disc 26. The supporting plate 19 has an annular groove formed in the lower face thereof in which a sealing ring 27 is disposed and held in place by the outer marginal portion of the disc 26. The stem 21 is threaded in the region of the plate 20 and a self-locking nut 28 is threaded thereon to secure the diaphragm 18, supporting plates 19 and 20, disc 26, and sealing ring 27 in assembled relation. The sealing ring 27 is cooperable with the seat 14 to control the flow of fluid through the main valve 1.

The cover 15 has a central threaded opening 30 above the stem 21 which is closed by a conventional pipe plug 31. A threaded opening 32 is formed in a lateral boss on the cover 15 and its outer end is similarly closed by a plug 33. The cover 15 cooperates with the diaphragm 18 to provide a pressure chamber 34 for operating fluid under pressure. The bushing 24 has one or more passages 24a to permit operating fluid from the chamber 34 to enter the space 24b above the bushing to balance the pressure on the valve stem 21. A lateral boss 35, similar to the boss 32, has a threaded opening 36 in which a conventional fitting 37 is mounted. One end of a tube or conduit 38 is connected to the fitting 37 for the purpose of conducting operating fluid to and from the diaphragm pressure chamber 34, as will be explained more fully hereinafter. A compression spring 39 is disposed in the chamber 34 between cover 15 and the plate 20 and constantly tends to urge the valve stem 21 downwardly toward its valve closing position against line pressure.

A conventional strainer 40 is mounted in a threaded opening 41 in communication with the inlet chamber 11 of the main valve 1. One end of a tube or conduit 42 is connected by a fitting 43 with the strainer 40. The other end of the conduit 42 is connected to the needle valve 3, previously referred to. A pipe-T 43 is connected in the conduit 42 between the strainer 40 and the needle valve 3. The stem of the pipe-T 43 has one end of a tube or conduit 44 connected thereto, the opposite end of which is connected with the pilot valve 4.

The details of the combined needle valve and strainer 3 are best shown in FIG. 4, to which reference will now be made.

The combination needle valve and strainer 3 comprises a housing 45 provided with a threaded lateral opening 46 in which a fitting 47 is mounted and which connects the conduit 42 with the housing 45. The housing 45 has a second lateral opening 48, offset 90° from the opening 46, in which a fitting 49 is mounted to connect the conduit 38 with the housing 45. The opening 46 communicates with a chamber 50 in the housing 45 and the opening 48 communicates with a chamber 51 in said housing, the chambers 50 and 51 being separated by a transverse wall 52.

A strainer assembly 53 is mounted in a threaded opening 54 at the outer end of the chamber 50 and includes a nozzle portion 55 that extends through the wall 52 and communicates with the chamber 51. A packing box 56 is mounted in the threaded outer end of a bore 57 in the strainer assembly 53 and carries an adjustable needle valve 58 having a threaded intermediate portion 58a, and a conical end disposed adjacent to the inlet of the orifice of the nozzle portion 55. The needle valve 58 is adjustable longitudinally in the strainer assembly 53 for regulating the rate of flow of operating fluid from the inlet chamber 11 of the main valve to the nozzle portion 55. The body of the strainer assembly 53 is provided with passageways 59 surrounded by a screen 60, which prevents foreign matter from passing into the bore 57 and through the nozzle 55. A gasket 61 forms a seal between the body 45 and a flange 62 at the outer end of the strainer assembly 53. The packing box 56 contains a packing 63, which forms a seal around the stem of the needle valve 58 and is retained in place by a gland 64 mounted in said box.

The housing 45 has a second threaded opening 65 that communicates with the chamber 51. A fitting 66 is mounted in the opening 65 and connects one end of a tube or conduit 67 thereto. The opposite end of the conduit 67 is connected to a fitting 68, FIG. 3, mounted in a threaded inlet opening 69 in the body 70 of the pressure differential operated pilot valve 5.

The details of the pressure differential operated pilot valve 5 are best shown in FIG. 3, wherefrom it will be seen that the valve body 70 has a threaded outlet opening 71 in which a fitting 72 is mounted for connecting a tube or conduit 73 thereto. A partition 74 in the body 70 separates inlet and outlet chambers associated with the openings 69 and 71 and serves as a support for an annular valve seat 75. The body 70 has a central opening 76 axially aligned with the seat 75.

A generally cylindrical intermediate valve section 77 is disposed above the valve body 70 and an annular gasket 78 is disposed between said valve section and said body. A plurality of studs 79 is mounted in the body 70 and these extend through openings in the gasket 78, and through openings in the valve section 77.

The intermediate valve section 77 has a transverse wall 80 provided with an opening 81 in which a valve stem 82 is slidably mounted. An O-ring 83, mounted in a recess 84 in the wall 80, forms a seal around the valve stem 82. The valve stem 82 has an externally threaded enlargement 85 at its lower end and carries a valve disc 86 secured thereto by an internally threaded, flanged retainer 87. The valve disc 86 is adapted to engage the valve seat 75 to shut off flow through the valve 5.

A flexible diaphragm 88 overlies the upper end of the intermediate valve section 77, and a cover 89 has a flange at its lower end that is engaged with the upper side of said diaphragm. The diaphragm 88 and the flange 90 have openings to receive the studs 79. Nuts 91 threaded on the studs 79 secure the valve body 70, diaphragm 78, intermediate valve section 77, diaphragm 88, and cover 89 in leak-proof assembled relation.

The valve stem 82 has a shoulder 92 disposed above the transverse wall 80 adapted to form an abutment for a diaphragm supporting washer 93 at the lower side of the diaphragm 88. A similar washer 94 is mounted upon the stem 82 above the diaphragm 88 and is internally threaded so that it also serves as a clamping nut for securing the diaphragm 88 to the valve stem 82. The cover 89 has an internally threaded boss 95 in which the lower end of a cylindrical stuffing box 96 is mounted. An adjusting screw 97 is mounted for longitudinal movement in the stuffing box 96 and has a lower end 98 that projects into a pressure chamber 99 in the cover 89. The lower half of the adjusting screw 97 is of plain cylindrical form and is sealed against leakage by an O-ring 100 mounted in the stuffing box 96. A jam nut 101 is threaded on the outer end of the adjusting screw 97 for retaining the same locked in adjusted position.

A compression spring 102 is disposed within the chamber 99 and its lower end is engaged with a washer 103 that bears against the upper conical end of the valve stem 82. The upper end of the spring 102 is engaged with a disc 104 that bears against the inner end 98 of the adjusting screw 97.

The upper face of the intermediate valve section 77 has a central recess 105 that cooperates with the diaphragm 88 to form a pressure chamber at the lower side of said diaphragm. A radial opening 106 communicates at its inner end with the chamber 104 and has a fitting 107 mounted in its outer end. The fitting 107 connects one end of a tube or conduit 108 in communicating relation with the chamber 105. The opposite end of the conduit 108 is connected with the pilot valve 4, as will be more fully explained hereinafter.

The cover 89 has a threaded opening 109 in which is mounted a fitting 110 having one end of a tube or conduit 111 connected thereto. The opposite end of the conduit 111 is connected to a fitting 112, FIG. 1, mounted in a threaded opening 113 communicating with the outlet chamber 12 of the main valve 1. A four-way fitting 114 is connected in the conduit 111, and one side of the fitting is connected with the conduit 73 extending from the outlet side of the pressure differential pilot valve 5. The opposite side of the fitting 114 is connected to one end of a tube or conduit 115, the opposite end of which is connected with the pilot valve 4 in a manner explained later.

The details of construction of the pilot valve 4 are best shown in FIGS. 5 to 9, inclusive, wherefrom it will be noted that said valve includes a circular fluid distribution base 116 having three radially extending threaded openings 117, 118 and 119, FIG. 6. The opening 117 has a fitting 120 mounted therein, which connects one end of the conduit 44 with the distribution base 116. The opening 118 has a fitting 121 mounted therein which connects the conduit 108 with the fluid distribution base 116, and the opening 119 has a fitting 122 mounted therein which connects one end of the conduit 115 with said base.

The fluid distribution base 116, FIG. 5, has a raised central seat 123 surrounded by an annular recess 124, in which a gasket 125 is disposed. A generally cylindrical pilot valve housing 126 has a flange 127 at one end thereof engaged with the gasket 125. The base 116 engages a mounting plate 129 and a plurality of bolts 128 extend through aligned openings in the flange 127, gasket 125, base 126, and mounting plate 129. Nuts 130 are threaded on the bolts 128 to secure the aforementioned parts in assembled relation.

The housing 126 contains a chamber 131 for operating fluid under pressure. A passage 132, FIGS. 6 and 7, located at the inner end of the opening 117 communicates with the pressure chamber 131. The seat 123 has an axial port 133 extending inwardly from the face thereof and is connected by a radial passageway 134 with the inner end of the opening 119. The seat 123 also has a port 135, FIG. 8, extending inwardly therefrom, which is connected by a radial passageway 136 with the inner end of the opening 118.

A rotatable pilot disc 137 is disposed in the pressure chamber 131 in engagement with the seat 123. The pilot disc has a generally U-shaped exhaust port 138, FIGS. 7 and 9, formed therein, which includes an axial leg portion 139 in constant communication with the axial port 133. The other leg portion 140 of the U-shaped port 131 is disposed the same radial distance from the port 133 as the port 135 so that, in the position of the pilot disc illustrated in FIG. 9, the pilot disc port 138 establishes communication between the seat ports 133 and 135. The pilot disc 137 also has a pressure port 141, FIG. 8, extending completely therethrough, and located the same radial distance from the axial port 133 as the port 135 so that, in another operative position of the pilot disc, pressure from the pressure chamber 131 can flow through the pilot disc port 141 into the seat port 135. The pilot disc 137 is further provided with four relatively small openings 142 that extend therethrough and are adapted to be filled with a solid lubricant L, to lubricate the surface of the seat 123.

The pilot valve housing 126 contains a passageway 142, FIG. 5, in which a pilot shaft 143 is rotatably mounted. Leakage of operating fluid from the pressure chamber 131 along the pilot shaft 143 is prevented by an O-ring 144 mounted in the housing 126 in surrounding relation to the shaft 143. The inner end of the shaft 143 carries a drive washer 145 having three radial projections 146 disposed 120° apart that extend into notches 147 formed in a skirt 148 extending from the pilot disc 137. The projections 146 and the notches 147 provide a non-rigid driving connection between the shaft 143 and the pilot disc 137. A compression spring 149 is disposed between the inner end of the shaft 143 and the adjacent face of the pilot disc 137 and continuously urges the pilot disc 137 into engagement with the seat 123.

An operating arm 150, FIG. 5, is secured to the shaft 143 for rotating the pilot disc 137 in response to angular movement of said arm. The arm 150 may be connected to a float 151, shown in dot-and-dash lines in FIG. 1, in order to adapt the pilot valve 4 to be controlled by variations in liquid level in a tank. It is to be understood, however, that the operating arm 150 of the pilot valve may be actuated by any suitable means. For example, the arm 150 may be manually actuated, or it may be actuated by a pressure-responsive device when a given pressure is reached, or by a thermally-responsive device when a given temperature is reached, or by any other factor or condition to which it is desired to make the main valve 1 responsive. When the pilot valve 4 is associated with a tank, the backing plate 130 may be secured by bolts 152, FIG. 1, to any suitable portion 153 of the tank.

It will be apparent from the aforedescribed structure, that operating fluid under line pressure is supplied to the pressure chamber 131 of the pilot valve 4 from the inlet chamber 11 of the main valve 1 through strainer 40, conduit 42, fitting 120, opening 117, and passage 132. Thus, in normal use, operating fluid under pressure is always available in the pressure chamber 131. Line pressure is also always communicated through conduit 42, needle valve 3, and conduit 38 to the diaphragm chamber 34 of the main valve 1, the rate of flow to said pressure chamber being controlled by the adjustment of the needle valve 58. Turning the needle valve adjusting member 58 clockwise will restrict the flow of operating fluid to the chamber 34 and cause the main valve 1 to close more slowly, whereas turning the member counterclockwise will produce faster closing of said main valve 1. A manually operable cock 38a may be connected in the conduit 38 to shut off flow to and from the diaphragm chamber 34.

Inlet pressure from the main valve 1 is also always available in the inlet of the pressure differential pilot valve 5 through the conduit 67, which connects the needle valve 3 with the inlet side of the valve 5.

It will also be clear from FIG. 1 that the outlet side of the valve 5 is in continuous communication with the outlet chamber 12 of the main valve 1 through the conduit 111, so that the outlet chamber of the valve 5 is always subject to the discharge pressure of the main valve. The discharge pressure is also always communicated through the conduit 111 to the pressure chamber 99 in the cover of the valve 5, so that this pressure acts in conjunction with the force exerted by the spring 102, to urge the valve stem 82 toward closed position. In this connection, the adjusting screw 97 is preferably factory-adjusted, so that the spring 102 continuously exerts a force equivalent to a pressure differential of 10 pounds per square inch (p.s.i.).

On the other hand, the chamber 105, at the lower side of the diaphragm 88 of the valve 5, is subject only to the inlet pressure of the main valve 1, when the pilot disc 137 is actuated by the arm 150 to the position shown in FIG. 8, wherein the flow of operating fluid from the pressure chamber 131 of the pilot valve 4 can occur through the conduit 108. The pressure of the fluid in the chamber 105 must be in excess of the combined pressure exerted by the discharge pressure in the chamber 99 and the spring 102, in order to effect opening of the pressure-differential-pilot valve 5, by moving the stem 82 upwardly.

The pilot disc exhaust port 138 and pressure port 141 may be made 0.078" in diameter; whereas, the seat port 135 is made considerably larger in diameter, to-wit, 0.113". The exhaust port 138 and the pressure port 141 of the pilot disc 137 are disposed on radii 44° apart, so that either port may be placed in full or partial registration with the seat port 135, or both may partially overlap with the port 135 upon movement of the operating arm 150 through a total angle of 60°, as will be clear from FIGS. 6, 6A, and 6B.

When the pilot disc 137 is in the position shown in FIGS. 6, 6A, and 8, the pressure port 141 of the pilot disc 137 will permit the flow of operating fluid under pressure from the pressure chamber 131 of the pilot valve, through seat port 135, passage 136, opening 118 and conduit 108 into the pressure chamber 105 to effect opening movement of the valve 5, whereupon operating fluid under pressure can flow from the pressure chamber 34 of the main valve 1 through conduit 38, housing 45, and conduit 67 into and through the valve 5, into conduits 73 and 111 to the discharge chamber 12 of the main valve. In this manner, operating fluid is exhausted from the main diaphragm chamber 34 to permit opening of the main valve with consequent flow through the pipeline 2.

Assuming that the pipeline 2 is supplying water to a tank and that the arm 150 is connected with a float in said tank, as the tank liquid level rises, the arm 150 will be moved clockwise and shift the pilot disc 137 through an angle sufficient to position the exhaust port 138 of the pilot disc 137 in registration with the seat port 135, the pilot disc 137 then assuming the position illustrated in FIGS. 6B and 9. When the pilot disc 137 is in this position, the supply of operating fluid under pressure to the chamber 105 in the valve 5 is not only cut off, but the fluid is permitted to exhaust through the conduit 108 and to pass through the pilot disc for discharge into the drain conduit 115, and thence through the conduit 111 into the outlet chamber 12 of the main valve. The exhaust of operating fluid from the chamber 105 will permit the discharge pressure in chamber 99 and the force of the spring 102 to urge the valve stem 82 toward valve closing position, thereby restricting the flow of operating fluid under pressure through the valve 5, and causing the same to back up through conduits 67 and 38 into the pressure chamber 34 of the main valve to effect closing movement of said main valve.

It will be understood that while the main valve 1 is open, operating fluid will be continuously by-passed through the differential pressure pilot valve 5, and that both valves may modulate between fully-open and fully-closed positions, as directed by the position of the disc 137 of the pilot valve 4.

Thus, while the pressure differential pilot valve 5 controls the main valve in accordance with the differential pressure between the inlet and discharge pressures of the main valve, it, nevertheless, is incapable of exerting exclusive control over the operation of the main valve 1, for the reason that the pilot valve 4 modifies the action of the valve 5, in accordance with the position of the float 151, or other means that may be employed to control the movement of the arm 150. Hence, while the pressure differential across the main valve 1 may indicate a certain valve action is in order, the action is corrected or modified in accordance with the particular factor controlling the operation of the pilot valve 4.

In connection with the modulating valve control system in FIG. 1, the self-correcting feature is provided through the connection of the conduit 111 with the pressure chamber 99 in the cover of the pressure differential pilot valve 5. This self-correcting feature is attained by applying the main valve discharge pressure to the upper side of the diaphragm 88. Thus, it will be seen that, if the float-operated pilot valve 4 increases the controlling pressure in chamber 105 as a signal to the main valve 1 to move in the opening direction, it follows that, as soon as the main valve opens slightly, the discharge pressure at the outlet side of the main valve will increase. This increase in discharge pressure is immediately reflected back to the control valve 5 and tends to counteract the earlier signal from the pilot valve 4 and acts to stop the main valve 1 from opening excessively. This self-correcting feature also applies in the reverse direction, in that a signal from the pilot valve 4 tending to close the main valve 1 will be somewhat counteracted by the effect of the reduction in the pressure on the discharge side of the main valve.

The pressure differential initially established by the setting of the spring 102 does have a definite bearing on the sensitivity or response time of the main valve 1. The higher the pressure differential setting, the more rapid the response. However, the principal reason for providing a spring adjustment means 97 is that, when the position of the float 150 associated with the pilot valve 4 calls for the main valve 1 to be completely closed, the pressures are equalized across the diaphragm 88 of the valve 5. At the same time, the differential pressure across the main valve 1, and consequently across the valve seat 75 of the valve 5, tends to move the stem 82 in the opening direction. Under these pressure conditions, the spring 102 serves the important function of offsetting the pre-set differential force and of holding the valve 5, and consequently the main valve 1, in the closed position.

FIG. 10 is a schematic view illustrating a modified modulating valve control system in which the pilot valve 4 has been replaced by two manually adjustable valves 154 and 155. In order to avoid repetition in description, the parts in FIG. 10 corresponding to those already described, will be referred to by the same reference numerals. As shown, the conduit 44 is connected to the inlet side of the valve 154; whereas, the conduit 115 is shown connected to the inlet side of the valve 155. The outlet side of the valve 154 is connected with the inlet side of the valve 155 by a conduit 156. A pipe-T 157 is connected in the conduit 156 and the stem of the T is connected with the conduit 108.

Accordingly, when the valve 154 is open and the valve 155 is closed, the pressure in the conduits 44 and 108 will be equal. In other words, both conduits will be subjected to the full pressure in the inlet chamber 11 of the main valve 1. When the valve 154 is closed and the valve 155 is open, the pressure in the conduit 108 will be equal to the discharge pressure in the conduits 111 and 115 and the outlet chamber 12 of the main valve. By adjusting the relative extent of opening of the valves 154 and 155, the pressure in the conduit 108, and hence in the pressure chamber 105 at the lower side of the diaphragm 88 of the pressure differential pilot valve 5, can easily be maintained equal to any intermediate pressure. One characteristic of this arrangement is that with a given setting, the pressure in the conduit 108 will be maintained at a given percentage of the difference between the pressures in the conduits 44 and 115. Hence, this basic control arrangement is capable of maintaining what might be called a "proportional intermediate pressure."

Illustrating this by mathematical example: With 100 pounds per square inch (p.s.i.) in the conduit 44 and zero pressure in the conduit 115, the valves 154 and 155 can be adjusted so that the pressure in the conduit 108 will be 40 p.s.i., or equal to the pressure in the conduit 115 plus 40% of the difference between the pressures in the conduits 44 and 115.

Thus, if $P1$ = the pressure in conduit 44
$P2$ = the pressure in conduit 108
$P3$ = the pressure in conduit 115, then
$P2 = 40\% \ (P1 - P3) + P3$
   $= 40\% \ (100 - 0) + 0$
   $= 40$ p.s.i.

With the valves 154 and 155 at the same setting but with a back pressure in the conduit 115 causing this pressure to rise to a value of 50 p.s.i. and maintaining 100 p.s.i. pressure in conduit 44, the pressure in the conduit 108 will be 70 p.s.i., or equal to the pressure in the conduit 115, plus 40% of the difference between the pressure in the conduit 44 and the pressure in the conduit 115. Using the same formula as above:

$P2 = 40\% \ (100 - 50) + 50$
   $= 70$ p.s.i.

Thus, the pressure in conduit 108 can be adjusted to a desired proportional intermediate pressure to govern the action of the pressure differential pilot valve 5 accordingly.

FIG. 11 diagrammatically illustrates another embodiment of a proportional pressure control arrangement in which a poppet valve 158 (shown in cross-section in FIG. 12) is connected with a slidable stem 159. The valve 158 is disposed in a hollow housing 160 having a valve seat 161 at one end thereof and a valve seat 162 at the opposite end thereof. In this modification, as in FIG. 10, the parts previously described are identified by the same reference numerals. Accordingly, the conduit 44 is shown connected to one end of the housing 160 by a fitting 163 disposed on the inlet side of the seat 160. The conduit 115 is connected with the housing 160 by a fitting 164 disposed on the inlet side of the seat 162. The conduit 108 is connected by a fitting 165 to a chamber 166 disposed between the valve seats 161 and 162.

It will be understood that the valve stem 159 may be actuated manually, or by any control means representing a condition or factor requiring predetermined operation of the main valve 1. Thus, any movement of the stem effecting movement of the poppet valve 158 toward the left causes the pressure in the conduit 108 to more nearly approach the pressure in the conduit 115; whereas, moving the poppet valve 158 toward the right will cause the pressure in the conduit 108 to increase toward the pressure in the conduit 44. When the poppet valve 158 is moved to the extreme right position into engagement with the seat 162, the pressure in the conduit 108 will equal the pressure in the conduit 44; whereas, when the poppet valve 158 is moved toward the extreme left into engagement with the seat 161, the pressure in the conduit 108 will be equal to the discharge pressure in the conduit 115. The pressure in conduit 108 is transmitted to the chamber 105 of the pressure differential pilot valve 5 to influence the action of the main valve 1.

The same results can be obtained with the ported pilot disc shown in FIGS. 5 to 9, inclusive. Thus, it will be seen that the seat port 135 in the fluid distribution base 116 communicates with the supply port 141 (FIG. 6) when the arm 150 is in its lowermost position, or with the exhaust port 138 (FIG. 6B) when the arm 150 is in its uppermost position, or, because of the overlap, can be connected to both ports 138 and 141 simultaneously when the arm 150 is in its intermediate position (FIG. 6A). With the pilot disc 137 in its intermediate position, the main valve inlet pressure will be communicated to conduit 108 through the pressure port 141, and main valve discharge pressure will be communicated through exhaust port 138 to the conduit 108, both through the seat port 135. Hence, a proportional pressure maintained in the conduit 108 is effective in the chamber 105 of the valve 5 to contribute to the control of the main valve 1.

One of the important features of the present modulating control system is that the main valve positional response is not greatly affected by the changes in the main valve inlet or discharge pressures. According to the present system, this is accomplished by employing the inlet and discharge pressures in a closed system, and by controlling or directing the main valve 1 to respond to the percentage pressure drop established by the setting of the pilot valve control 4, the valves 154 and 155, and the valve 158. In view of the fact that a closed control system is provided and the further fact that the pilot controls generate a proportional pressure drop, it follows that the main valve 1 will respond to maintain a proportion of its total possible pressure drop, depending upon the condition established in the pilot control.

Another important feature of the present control system is that the main valve 1 can be controlled with a minimum number of control lines connecting the pilot control and the main valve. It has been found that the three lines, 44, 108, and 115, connecting the pilot control to the main valve can be several hundred feet in length, and the control tubing may have an outside diameter of one-fourth inch and an inside diameter of three-sixteenths inch and provide ample capacity. The reason that such low capacity conduit or tubing can be successfully used for the control lines is that, for all practical purposes, the controlling pressure signal is relatively static, and any pressure loss in the lines from the main valve inlet 11 or to the main valve outlet 12 simply becomes a part of the proportional pressure-drop condition established in the pilot control system.

It will be understood that various changes may be made in the details of construction and in the arrangement of the elements comprising the main valve and modulating valve control systems disclosed herein, without departing from the principles of the invention or the scope of the annexed claims.

I claim:

1. A fluid pressure operable main valve and modulating control system therefor, comprising: a pressure differential operated control valve connected with said main valve for controlling the supply and exhaust of operating fluid to said main valve; means for applying the discharge pressure of said main valve to said pressure differential operated control valve; pilot means connected with said main valve for applying inlet pressure to said pressure differential operated control valve in opposition to the outlet pressure of said main valve; and means for actuating said pilot valve in response to a given condition related to the operation of said main valve for controlling said main valve through said pressure differential operated control valve.

2. A fluid pressure operable main valve and modulating control system therefor, said fluid pressure operable main valve having an inlet, an outlet, and a diaphragm chamber for operating fluid; a supply conduit for operating fluid interconnecting the inlet of said main valve with the outlet of said main valve; means connecting said supply conduit with said diaphragm chamber; a pressure differential operated valve connected in said supply conduit and arranged to by-pass operating fluid intended for said diaphragm chamber, said pressure differential operated valve including a diaphragm, a flow-control element connected with said diaphragm, a first pressure chamber on one side of said diaphragm, and a second pressure chamber on the opposite side of said diaphragm; means connecting said first pressure chamber with the outlet of said main valve; pilot means connected with said supply conduit for controlling the supply and exhaust of operating fluid to said second pressure chamber; and means for actuating said pilot valve in response to a given condition related to the operation of said main valve.

3. A fluid pressure operable main valve and modulating control system therefor, comprising: a pressure differential operated control valve connected with said main valve for controlling the supply and exhaust of operating fluid to said main valve; means for applying the discharge pressure of said main valve to said pressure differential operated valve; pilot means for applying a pressure to said pressure differential operated valve proportional to the difference in the inlet and outlet pressures of said main valve, in opposition to the outlet pressure of said main valve; and means for actuating said pilot valve in response to a given condition related to the operation of said main valve for controlling said main valve through said pressure differential operated control valve.

4. A fluid pressure operable main valve and modulating control system therefor, said fluid pressure operable main valve having an inlet, an outlet, and a diaphragm chamber for operating fluid; a supply conduit for operating fluid interconnecting the inlet of said main valve with the outlet of said main valve; means connecting said supply conduit with said diaphragm chamber; a pressure differential operated valve connected in said supply conduit and arranged to by-pass operating fluid intended for said diaphragm chamber, said pressure differential operated valve including a diaphragm, a flow-control element connected with said diaphragm, a first pressure chamber on one side of said diaphragm, and a second pressure chamber on the opposite side of said diaphragm; means connecting said first pressure chamber with the outlet of said main valve; pilot means connected with said second pressure chamber, with said supply conduit, and with the outlet of said main valve for applying a pressure to said second chamber proportional to the difference between the inlet and outlet pressures of said main valve; and means actuating said pilot valve in response to a given condition related to the operation of said main valve.

5. A fluid pressure operable main valve and modulating control system therefor, as defined in claim 4, in which the pilot means for applying the proportional pressure comprises adjustable means for varying the relative portion of the inlet and outlet pressures applied to the second pressure chamber of said pressure differential operated valve.

6. A fluid pressure operable main valve and modulating control system therefor, as defined in claim 4, in which the pilot means for producing the proportional pressure comprises a conduit interconnecting the inlet and outlet of said main valve, a pair of manually operable valves connected in said conduit, and a second conduit connected with said first-mentioned conduit at a point between the said manually operable valves, said second conduit communicating with the second pressure chamber of said pressure differential operated valve.

7. A fluid pressure operable main valve and modulating control system therefor, as defined in claim 4, in which the pilot means for producing the proportional pressure comprises a conduit interconnecting the inlet and outlet chambers of said main valve, a valve connected in said last-mentioned conduit and including a housing having a chamber therein and a valve seat at either end of said chamber, a slidable poppet valve in said chamber selectively engageable with either seat, and a conduit communicating with said valve chamber and being connected with the second pressure chamber of said pressure differential operated valve.

8. A fluid pressure operable main valve and modulating control system therefor, as defined in claim 4, in which the pilot means for producing the proportional pressure comprises a pilot valve housing having pressure connections with the inlet and discharge of said main valve, a ported pilot disc in said pilot valve housing for simultaneously interconnecting said conduit means extending from the inlet and discharge chambers of said main valve, respectively, for varying the proportional flow of inlet and outlet pressure; and means extending from said pilot valve and connected with said second pressure chamber for communicating the proportional pressure to said second pressure chamber.

9. A fluid pressure operable main valve and modulating control system therefor, comprising: a pressure differential operated valve connected with said main valve for controlling the supply and exhaust for operating fluid to said main valve, said pressure differential operated valve having a flow-control element, a diaphragm connected with said flow-control element, a first pressure chamber on one side of said diaphragm, and a second pressure chamber on the opposite side of said diaphragm; means applying the outlet pressure of said main valve to said one pressure chamber; a pilot valve responsive to a given condition related to the operation of said main valve; means for conducting the inlet pressure of said main valve to said pilot valve; means connecting said pilot valve with the second pressure chamber of said pressure differential operated valve, said pilot valve being operable to apply inlet pressure to said second pressure chamber in opposition to the outlet pressure supplied to said first pressure chamber, whereby to control the supply of operating fluid to said main valve to effect opening and closing thereof in accordance with the pressure differential between said inlet and outlet pressures; and means for actuating said pilot valve in response to said given condition.

10. A fluid pressure operable main valve and modulating control system, as defined in claim 9, in which the pilot valve includes a seat having a port communicating with the means connecting the pilot valve with the second pressure chamber of the pressure differential operated control valve; and a pilot disc having a pressure port and an exhaust port of relatively smaller diameter than said seat port and radially spaced so that in one operative position of said pilot disc, both the exhaust and pressure ports are in communication with said seat port.

11. A fluid pressure operable main valve and modulating control system, as defined in claim 10, in which the pilot disc pressure and exhaust ports are spaced on radii about 44° apart.

12. A fluid pressure operable main valve and modulating control system, as defined in claim 11, in which the means for actuating the pilot valve rotates the pilot disc through a maximum angle of about 60°.

13. In combination, a fluid pressure operable main valve having an inlet, an outlet, and a diaphragm chamber for operating fluid; a pilot valve; a supply conduit for operating fluid extending from the inlet of said main valve to said pilot valve; means for conducting operating fluid under pressure from the inlet of said main valve to the diaphragm chamber of said main valve; a pressure differential operated valve connected with said last-mentioned means arranged to by-pass operating fluid intended for the diaphragm chamber of said main valve, said pressure differential operated valve including a diaphragm, a flow-control element connected with said diaphragm, a first pressure chamber on one side of said diaphragm, and a second pressure chamber on the opposite side of said diaphragm; means communicating discharge pressure from the outlet of said main valve to said first chamber at one side of said diaphragm; means connecting said pilot valve with said second pressure chamber on the opposite side of said diaphragm for communicating inlet pressure thereto through said pilot valve; and means responsive to a given condition related to the operation of said main valve for actuating said pilot valve to admit and exhaust operating fluid from said second pressure chamber.

14. The combination defined in claim 13, including means in said first pressure chamber applying a predetermined force to said diaphragm acting in the same direction as said discharge pressure.

15. The combination defined in claim 14, including means for adjusting said force applying means.

16. The combination defined in claim 13, including a needle valve arranged in advance of said pressure differential operated valve for controlling the rate of flow of operating fluid to the diaphragm chamber of said main valve.

References Cited in the file of this patent

UNITED STATES PATENTS

| | | |
|---|---|---|
| 2,344,583 | Annin | Mar. 21, 1944 |
| 2,447,408 | Griswold | Aug. 17, 1948 |
| 2,840,104 | Shafer | June 24, 1958 |
| 2,854,994 | Glasgow | Oct. 7, 1958 |
| 2,860,657 | Spence | Nov. 18, 1958 |
| 2,991,796 | Griswold | July 11, 1961 |